US005707712A

United States Patent [19]

Fujimura et al.

[11] Patent Number: 5,707,712

[45] Date of Patent: Jan. 13, 1998

[54] THERMOSENSITIVE STENCIL PAPER AND THE METHOD OF PRODUCING THE SAME

[75] Inventors: Manabu Fujimura, Shibata-machi; Fumiaki Arai, Mishima; Hideyuki Yamaguchi, Numazu; Masayuki Ohta, Shibata-machi, all of Japan

[73] Assignees: Ricoh Company, Ltd., Tokyo; Tohoku Ricoh Co., Ltd., Miyagi-ken, both of Japan

[21] Appl. No.: 603,598

[22] Filed: Feb. 21, 1996

[30] Foreign Application Priority Data

| | | | |
|---|---|---|---|
| Feb. 22, 1995 | [JP] | Japan | 7-057972 |
| May 15, 1995 | [JP] | Japan | 7-139916 |
| Jan. 25, 1996 | [JP] | Japan | 8-031440 |
| Feb. 21, 1996 | [JP] | Japan | 8-058562 |

[51] Int. Cl.[6] ..... B32B 3/00

[52] U.S. Cl. ..... 428/195; 428/411.1; 428/537.5; 428/913; 556/400; 556/465; 427/256

[58] Field of Search ..... 428/195, 207, 428/913, 914, 411.1, 323, 537.5; 556/400, 465; 427/256

[56] References Cited

U.S. PATENT DOCUMENTS 5,091,257 2/1992 Nonogaki et al. .

*Primary Examiner*—William Krynski

*Attorney, Agent, or Firm*—Oblon, Spivak, McClelland, Maier & Neustadt, P.C.

[57] ABSTRACT

A thermosensitive stencil paper includes a thermoplastic resin film, and optionally a porous support for supporting the resin film thereon, and a silicone oil containing layer formed the resin film, which contains at least one modified silicone oil component selected from the group consisting of (a) an ether•epoxy-modified silicone oil having both an epoxy group and an ether group and (b) an ether-modified silicone oil with HLB of 6 or less. The above thermosensitive stencil paper can be produced by coating a coating liquid which contains at least one of the above-mentioned modified silicone oils in an amount of 2.0 $g/m^2$ or less before the drying of the coating liquid.

5 Claims, No Drawings

THERMOSENSITIVE STENCIL PAPER AND THE METHOD OF PRODUCING THE SAME

BACKGROUND OF THE INVENTION

1. Field of the Invention

The present invention relates to a thermosensitive stencil paper and a method of producing the same, particularly to a thermosensitive stencil paper comprising a modified silicone oil containing layer, from which a printing master with excellent quality can be produced by use of a heating element such as a thermal head, and also to a method of producing such a thermosensitive stencil paper.

2. Discussion of Background

Generally there are known two types of thermosensitive stencil papers, one from which a printing master is prepared by closely superimposing a thermosensitive stencil paper and an original and irradiating the superimposed stencil paper and original with infrared rays, which may be referred to as "infrared irradiation type stencil paper; and one from which a printing master is prepared by bringing a heating element such as a thermal head into contact with the stencil paper to apply thermal energy thereto, which may be referred to as "heating element type stencil paper".

In both the above-mentioned types, the stencil paper is composed of a porous substrate and a thermoplastic resin film stuck thereon, or composed of a thermoplastic resin film alone. Each type has its own advantages and disadvantages. However, the infrared irradiation type stencil paper As more frequently used than the heating element type stencil paper, because the former is capable of providing a better printing master than the latter.

When a printing master is prepared directly from the above-mentioned heating element type stencil paper by use of a thermal head, the thermoplastic resin film is fused and adheres to the thermal head. As a result, the transportation of the stencil paper is hindered and dust from the resin film gradually adheres to the thermal head, so that a proper printing master cannot be obtained.

In order to avoid such a problem, a sticking preventing layer is generally provided on the surface of the thermoplastic resin film.

For instance, there are known the provision of a sticking preventing film layer composed of silicone with excellent releasability on the surface of a thermoplastic resin film as disclosed in Japanese Patent Publication 48-30570 and Japanese Laid-Open Patent Application 4-7197; the provision of a water-soluble silicone oil layer as disclosed in Japanese Laid-Open Patent Application 58-92595; and the provision of a room-temperature-curing silicone layer as disclosed in Japanese Laid-Open Patent Application 58-153697.

The above-mentioned sticking preventing layers, however, have the shortcoming that when the silicone oils for use in the above-mentioned layers are in the form of a liquid at room temperature, such silicone oils tend to spread into the porous substrate of the stencil paper during the preservation thereof in the form of a roll or sheet, so that the sticking preventing effects of the above-mentioned layers are decreased.

In the case where a room-temperature-curing silicone is employed for the formation of a sticking preventing layer on the thermoplastic resin film, a coated room-temperature-curing silicone has to be allowed to stand for at least about 3 days before use. In other words, the room-temperature-curing silicone layer has the shortcoming that its production efficiency is poor.

In order to solve the above-mentioned problems, there have been proposed a method of using a thermosetting silicone resin and a method of using an ultraviolet curing silicone as disclosed in Japanese Laid-Open Parent Application 61-295098 and Japanese Laid-Open Patent Application 4-201294; and methods of using fluoroplastics as disclosed in Japanese Laid-Open Patent Applications 60-19591 and 60-97891.

However in the case where a thermosetting silicone resin is used for the formation of a sticking preventing layer on the thermoplastic resin film, the silicone resin is heated to 100° C. or more for the thermosetting thereof, so that a considerable amount of heat is applied to the thermoplastic resin film which usually has a thickness of 2 μm to 20 μm. The result is that wrinkles are formed in the thermoplastic resin film and the thus produced thermosensitive stencil paper extremely curls.

In the case where an ultraviolet curing silicone resin is used for the formation of the sticking preventing layer, special production facilities are required. In addition, the sticking preventing layer made of the ultraviolet curing silicone resin has the shortcoming that its perforation performance when making a printing plate by a thermal head decreases once the silicone resin has been set and become heat resistant, even though the running of the thermal head on the surface of the sticking preventing layer is possible.

Conventionally, a sticking preventing layer is provided by coating with a dispersion of any of the above-mentioned sticking preventing agents diluted in a solvent, which is referred to as a solvent system, or with a silicone emulsion diluted with water, which is referred to an emulsion system.

In the case of the solvent system, the production facilities are costly since explosion-proof facilities and solvent recovering facilities are required.

In the case of the emulsion system, since the silicone emulsion is easily broken and therefore a coating method such as a gravure roll method cannot be employed. This is because An the gravure roll method, high shearing force is applied to the coating liquid, although the &mount of the coating liquid to be deposited on the thermoplastic resin film can be reduced.

Therefore, conventionally, for instance, a coating method using a wire bar is employed for forming a sticking preventing layer since the shearing force applied to the coating liquid is low. However, in this method, a large amount of the coating liquid is deposited on the thermoplastic resin film so that the coated coating liquid cannot be dried at high speed.

Conventionally, there are known such a wire bar coating, kiss-roll coating, reverse-roll coating, and gravure coating. Gravure coating is an excellent coating method since the coating liquid can be deposited in a small amount and therefore the energy for drying coating liquid is small, and even for an aqueous sticking preventing liquid, the coating can be performed at high speed.

In the case of a direct gravure coating method, however, when a conventional emulsion type aqueous sticking preventing coating liquid is employed, large shearing force is applied to the emulsion type coating liquid between a gravure roll and a back-up roll; and in the case of a gravure offset method, the large shearing force is applied to the emulsion type coating liquid between a gravure roll and an offset roll, and between the offset roll and a back-up roll via the stencil paper, so that the emulsion type coating liquid is broken and the gravure roll is clogged and eventually the surface of the gravere roll becomes water repellent due to the water-repellent effect of the silicone oil contained in the emulsion type coating liquid. As a result, the amount of the coating liquid deposited on the gravure roll is gradually decreased with time.

A conventionally known water-soluble ether-modified silicone oil described in Japanese Laid-Open Patent Application 58-92595 cannot maintain excellent sticking preventing performance for a long period of preservation.

For avoiding environmental pollution problems, there has been a demand for an aqueous sticking preventing layer that can be prepared without using any organic solvent.

SUMMARY OF THE INVENTION

It is therefore a first object of the present invention to provide a thermosensitive stencil paper from which the above-mentioned problems of the conventional thermosensitive stencil papers have been eliminated, and which is capable of performing excellent perforation by a thermal head, with excellent sticking prevention effect and antistat effect, without causing the peeling of the resin film even when preserved for a long period of time.

A second object of the present invention is to provide a thermosensitive stencil paper which can be produced by stable coating by using a coating liquid without containing any organic solvent or with an extremely small amount of an organic solvent under excellent manufacturing conditions even when a roll coating method such as gravure coating which applies high shearing force to the coating liquid is employed.

A third object of the present invention is to provide a method of producing the thermosensitive stencil paper in the above-mentioned first and second objects of the present invention.

The above-mentioned first and second objects of the present invention can be achieved by a thermosensitive stencil paper comprising a thermoplastic resin film, and a modified silicone oil containing layer formed thereon which comprises at least one modified silicone oil component selected from the group consisting of (a) an ether•epoxy-modified silicone oil having both an epoxy group and an ether group and (b) an ether-modified silicone oil with HLB of 6 or less.

The above thermosensitive stencil paper may further comprise a porous support for supporting thereon the thermoplastic resin film.

It is preferable that in the above thermosensitive stencil paper, the modified silicone oil containing layer which is provided on the thermoplastic resin film be in a deposition amount in the range of 0.005 to 0.5 $g/m^2$ on a dry basis.

The third object of the present invention can be achieved by a method of producing a thermosensitive stencil paper comprising a thermoplastic resin film, and a modified silicone oil containing layer formed thereon which comprises at least one modified silicone oil component selected from the group consisting of an ether•epoxy-modified silicone oil having both an epoxy group and an ether group and an ether-modified silicone oil with HLB of 6 or less, comprising the step of coating a coating liquid comprising at least one modified silicone oil component selected from the group consisting of an ether•epoxy-modified silicone oil having both an epoxy group and an ether group and an ether-modified silicone oil with HLB of 6 or less, in an amount of 2.0 $g/m^2$ or less before the drying of the coating liquid.

In the above method, the thermosensitive stencil paper may further comprise a porous support for supporting thereon the thermoplastic resin film.

DESCRIPTION OF THE PREFERRED EMBODIMENTS

According to the present invention, there is provided a thermosensitive stencil paper comprising a thermoplastic resin film which may be supported on a porous support, and a modified silicone oil containing layer formed thereon which comprises at least one modified silicone oil component selected from the group consisting of (a) an ether•epoxy-modified silicone oil having both an epoxy group and an ether group end (b) an ether-modified silicone oil with HLB of 6 or less.

By the provision of the above-mentioned silicone oil containing layer, there can be obtained a thermosensitive stencil paper which is capable of performing excellent perforation by a thermal head, with excellent sticking prevention effect and antistat effect, without causing film peeling even when used after the preservation for a long period of time, and which can be produced by stable coating by using a coating liquid without containing any organic solvent or with an extremely small amount of an organic solvent under excellent manufacturing conditions even when a roll coating method such as gravure coating which applies high shearing force to the coating liquid is employed.

It is preferable that the modified silicone oil containing layer be in a deposition amount in the range of 0.005 to 0.5 $g/m^2$ on a dry basis.

When the deposition amount of the silicone oil containing layer is less than 0.005 $g/m^2$, the sticking preventing performance thereof is slightly degraded, while when the deposition amount of the silicone oil containing layer is more than 0.5 $g/m^2$, dust from the modified silicone oil containing layer tends to increasingly adhere to the thermal head.

Furthermore, since the modified silicone oil containing layer has excellent antistat effect, the stencil paper can be smoothly transported through a stencil printing machine, and there can be hindered the curling of printed matters when discharged from the stencil printing machine by the antistat effect of the silicone oil containing layer.

Furthermore, the present invention provides a method of producing the above-mentioned thermosensitive stencil paper, which comprises the step of coating a coating liquid comprising at least one modified silicone oil component selected from the group consisting of an ether•epoxy-modified silicone oil having both an epoxy group and an ether group and an ether-modified silicone oil with HLB of 6 or less, in an amount of 2.0 $g/m^2$ or less before the drying of the coating liquid.

The modified silicone oils employed in the present invention are ones modified with an ether group so that they are hydrophilic, and even if strong shearing force is applied thereto, the coating liquid for the formation of the modified silicone oil containing layer is not broken and the modified silicone oil coating layer does not become water repellent.

The ether•epoxy-modified silicone oil for use in the present invention is one represented by any of the following general formulae (I) and (II):

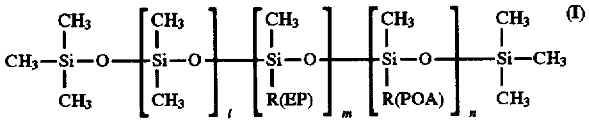

(I)

wherein R is an alkylene group having 1 to 10 carbon atoms, 1 is an integer of 1 to 100, m is an integer of 1 to 50, n is an integer of 1 to 50, EP represents

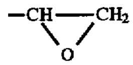 or 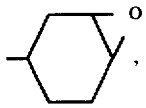, and POA represents a polyalkylene oxide.

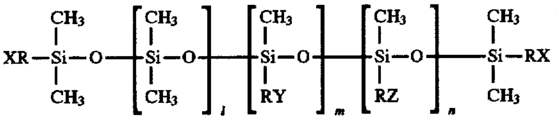 (II)

wherein R, l, m and n are respectively the same as in the above-mentioned general formula (I), X is a polyalkylene oxide,

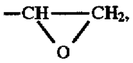, 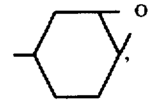, or an alkyl group,
Y is

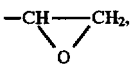, 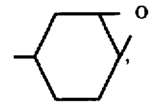, or an alkyl group, and Z is a polyalkylene oxide or an alkyl group, and the ether group and the epoxy group may be bonded to any side chain, one terminal and two opposite terminals of the above ether•epoxy-modified silicone oil.

Further, the ether-modified silicone oil with HLB of 6 or less for use in the present invention is one represented by any of the following general formulae (III), (IV) and (V):

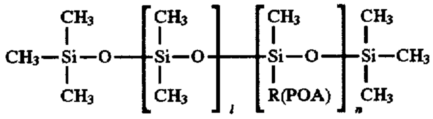 (III)

wherein R, l, n and POA are respectively the same as in the above-mentioned general formula (I)

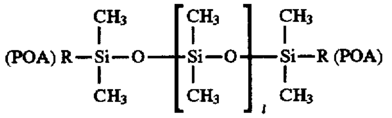 (IV)

wherein R, l, and POA are respectively the same as in the general formula (I).

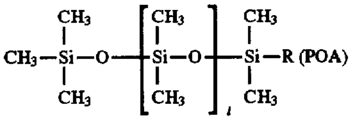 (V)

wherein R, l, and POA are respectively the same as in the general formula (I).

The above-mentioned ether•epoxy-modified silicone oil has the feature of being water-soluble because of the ether modification thereof. Therefore, the ether•epoxy-modified silicone oil is dissolved in water and can be coated on the thermoplastic resin film to form this particular modified silicone oil containing layer thereon, whereby there can be obtained a thermosensitive stencil paper without the problem of the film being degraded by the modified silicone oil containing layer, with substantially no curling. Furthermore, when the modified silicone oil containing layer is formed, it is not necessary to use any organic solvents which may cause environmental pollution problems.

Furthermore, as mentioned above, as the ether-modified silicone oil with HLB of 6 or less for use in the present invention, any ether-modified silicone oils represented by any of the above-mentioned general formulae (III), (IV) and (V) can be employed, in which the ether group may be bonded to any side chain, one terminal and two opposite terminals of the above ether-modified silicone oil.

When the HLB of the ether-modified silicone oil is more than 6, the water solubility thereof tends to increase, but the sticking preventing effect tends to decrease, so that an ether-modified silicone oil with HLB of more than 6 is not preferable for use in the present invention. However, in the present invention, there can be employed such an ether-modified silicone oil that is insoluble in water, but self-emulsifiable or dispersible in water, or can form a stable dispersion when it is dissolved in a water-soluble solvent such as alcohol and then diluted with water.

In the present invention, it is preferable that the content of the above-mentioned ether•epoxy-modified silicone oil and/or the ether-modified silicone oil with HLB of 6 or less be 10 wt.% or more, more preferably 20 wt.% or more, in terms of the solid components thereof in the modified silicone oil containing layer.

When the content thereof is less than 10 wt%., the sticking preventing effect of the modified silicone silicone oil containing layer tends to decrease in the course of an extended period of preservation, so that when preserved for a long period of time, the thermoplastic film may be peeled off due to the sticking thereof to a thermal head during the perforation by the thermal head.

In the present invention, one of the ether•epoxy-modified silicone oil or the ether-modified silicone oil with HLB of 6 or less, or both may be used.

To the modified silicone oil containing layer, there may be added silicone resins, other silicone oils, and an antistatic agent so long as the objects of the present invention are not impaired by the addition of such additives.

More specifically, examples of such additives include an ether-modified silicone oil with HLB of more than 6; polyfunctional water-soluble silicone oils such as alcohol-modified silicone oil, carboxy-modified silicone oil and amino-modified silicone oil; and water-soluble compounds such as antistatic agents, wetting agents, and surfactants such as phosphoric ester.

It is preferable that the modified silicone oil containing layer be provided on the thermoplastic resin film in a deposition mount in the range of 0.005 to 0.5 g/m2 on a dry basis, depending upon the kind of modified silicone oil employed.

When the modified silicone oil containing layer is provided on the thermoplastic resin film, it is preferable that a coating liquid comprising at least one modified silicone oil component selected from the group consisting of (a) an ether•epoxy-modified silicone oil having both an epoxy group and an ether group and (b) an ether-modified silicone oil with HLB of 6 or less be coated on the thermoplastic resin film in an amount of 2.0 g/m2 or less before the drying of the coating liquid.

For the amount of the above-mentioned coating liquid to be set at 2.0 g/$m^2$ or less before the drying of the coating liquid, it is preferable to employ a roll coating method. Specific examples of the roll coating method include direct gravure roll coating, offset gravure roll coating, two-reverse-roll coating, three-reverse-roll coating, and four-reverse-roll coating. Of these coating methods, direct gravure roll coating and offset gravure roll coating are preferable for use in the present invention.

Specific examples of the porous support for use in the present invention are Japanese paper, paper made of synthetic fibers, and varieties of woven and unwoven fabrics.

Specific examples of the thermoplastic resin film for use in the present invention are vinyl chloride-vinylidene chloride copolymer film, polyester film, polyethylene film and polypropylene film. Of these films, polyester film is preferable for use in the present invention.

Other features of this invention will become apparent in the course of the following description of exemplary embodiments, which are given for illustration of the invention and are not intended to be limiting thereof.

Example 1

A polyester film with a thickness of about 2 μm was stuck on a sheet of Japanese paper with a basis weight of 11 $g/m^2$ by use of a chlorinated polypropylene resin serving as an adhesive agent with a deposition amount of about 0.5 $g/m^2$ and was then dried at 50° C., whereby base paper was fabricated.

To the thus fabricated base paper, a modified silicone oil containing layer formation coating liquid, namely a 2.0 wt.% aqueous solution of a mixture of the nonvolatile components with the formulation in Example 1 as shown in TABLE 1, was applied with a coating deposition amount of 2.0 $g/m^2$ with a coating speed of 90 m/min by a direct gravure roll, and then dried at 50° C., whereby a modified silicone oil containing layer with a deposition amount of about 0.04 $g/m^2$ on a dry basis was formed on the polyester film. Thus, a thermosensitive stencil paper No. 1 of the present invention was fabricated.

Examples 2 to 4 and Comparative Examples 1 to 3

The procedure of the fabrication of the thermosensitive stencil paper No. 1 of the present invention in Example 1 was repeated except that the formulation of the mixture of the nonvolatile components for the modified silicone oil containing layer formation coating liquid employed in Example 1 was changed to the respective formulations in Examples 2 to 4 and Comparative Examples 1 to 4 as shown in TABLE 1, whereby thermosensitive stencil papers Nos. 2 to 4 of the present invention An Examples 2 to 4 and comparative thermosensitive stencil papers Nos. 1 to 3 in Comparative Examples 1 to 3 were fabricated.

TABLE 1

| | Epoxy ether-modified silicone oil *1) | Ether-modified silicone oil *2) | Ether-modified silicone oil *3) | Ether-modified silicone oil *4) | Antistatic agent *5) |
|---|---|---|---|---|---|
| Ex. 1 | 10 | 0 | 75 | 0 | 15 |
| Ex. 2 | 35 | 0 | 50 | 0 | 15 |
| Ex. 3 | 55 | 0 | 30 | 0 | 15 |
| Ex. 4 | 30 | 25 | 30 | 0 | 15 |
| Comp. Ex. 1 | 0 | 0 | 85 | 0 | 15 |
| Comp. Ex. 2 | 0 | 0 | 50 | 35 | 15 |

TABLE 1-continued

| | Epoxy ether-modified silicone oil *1) | Ether-modified silicone oil *2) | Ether-modified silicone oil *3) | Ether-modified silicone oil *4) | Antistatic agent *5) |
|---|---|---|---|---|---|
| Comp. Ex. 3 | 0 | 0 | 0 | 85 | 15 |

*1) Trademark "POLON-MF13" made by Shin-Etsu Chemical Co., Ltd.
*2) Trademark "FZ2172(HLB 2)" made by Nippon Unicar Co., Ltd.
*3) Trademark "K76004(HLB 9)" made by Shin-Etsu Chemical Co., Ltd.
*4) Trademark "L7001(HLB 7)" made by Nippon Unicar Co., Ltd.
*5) Trademark "Elegan 264A" made by NOF CORPORATION.

Each of the above fabricated thermosensitive stencil papers Nos. 1 to 4 of the present invention and comparative thermosensitive stencil papers Nos. 1 to 3 was subjected to printing master preparation and print making tests by use of a printing master making machine ("Preport SS950" made by Ricoh Company, Ltd.). More specifically, one printing master was prepared by use of a solid-image-bearing original with a size of 23 x 12 cm and 20 prints were made by the printing master with respect to each of the above-mentioned thermosensitive stencil papers Nos. 1 to 4 of the present invention and comparative thermosensitive stencil papers Nos. 1 to 3, and this printing master preparation and print making operation was continuously repeated to make 10 printing masters in total, whereby each stencil paper was evaluated with respect to the transportation performance and the peeling of the thermoplastic resin film thereof before the preservation thereof and after the preservation thereof at 50° C. for one week.

The results are shown in the following TABLE 2:

TABLE 2

| | Sticking Property of Sencil Paper before Preservation | | Sticking Property of Stencil Paper Preserved at 50° C. for 1 Week | |
|---|---|---|---|---|
| | Wrinkles formed during transportation of stencil paper | Peeling of thermoplastic resin film | Wrinkles formed during transportation of stencil paper | Peeling of thermoplastic resin film |
| Ex. 1 | None | None | None | None |
| Ex. 2 | None | None | None | None |
| Ex. 3 | None | None | None | None |
| Ex. 4 | None | None | None | None |
| Comp. Ex. 1 | None | None | Observed | Observed |
| Comp. Ex. 2 | Observed | Observed | Observed | Observed |
| Comp. Ex. 3 | Observed | Observed | Observed | Observed |

The results shown in the above TABLE 2 indicate that the stencil papers Nos. 1 to 4 of the present invention in Examples 1 to 4 maintained their respective excellent transportation performances even after the preservation at 50° C. for 1 week and no peeling of the thermoplastic resin film took place.

In sharp contrast to this, the transportation performance of each of the comparative stencil papers Nos. 1 to 3 in Comparative Examples 1 to 3 became conspicuously poor and the peeling of the resin film took place at the rear end of the solid image, with the formation of wrinkles by the platen roller employed, after the preservation.

Example 5

A polyester film with a heat shrinkage ratio of 35% and a thickness of about 3.5 μm was stuck on a sheet of Japanese paper with a basis weight of 11 $g/m^2$ use of a chlorinated polypropylene resin serving as an adhesive agent with a deposition amount of about 0.5 $g/m^2$ and was then dried at 50° C., whereby a base paper was fabricated.

To the thus fabricated base paper, a modified silicone oil containing layer formation coating liquid, namely a 1.5 wt.% aqueous solution of a mixture of the nonvolatile components with the same formulation as in Example 1 as shown in TABLE 1, was applied with a coating deposition amount of 2.0 $g/m^2$ with a coating speed of 90 m/min by a direct gravure roll, and dried at 50° C. whereby a modified silicone oil containing layer with a deposition amount of about 0.03 $g/m^2$ on a dry basis was formed on the polyester film. Thus, a thermo-sensitive stencil paper No. 5 of the present invention was fabricated.

Examples 6 to 8 and Comparative Examples 4 to 6

The procedure of the fabrication of the thermosensitive stencil paper No. 5 of the present invention in Example 5 was repeated except that the formulation of the mixture of the nonvolatile components for the modified silicone oil containing layer formation coating liquid employed in Example 5 was changed to the same respective formulations as in Examples 2 to 4 and Comparative Examples 1 to 3 as shown in TABLE 1, whereby thermosensitive stencil papers Nos. 6 to 8 of the present invention and comparative thermosensitive stencil papers Nos. 4 to 6 were respectively fabricated in Examples 6 to 8, and Comparative Examples 4 to 6.

Each of the above fabricated thermosensitive stencil papers Nos. 5 to 8 of the present invention and comparative thermosensitive stencil papers Nos. 4 to 6 was subjected to printing master preparation and print making tests by use of a thermal head including a heating element with a length of 40 μm in the main scanning direction and a length of 30 μn in the subscanning direction, with an average resistance of 2300 Ω under the application of a power of 0.11 W with a pulse width of 500 μsec. More specifically, one printing master was prepared by use of a solid-image-bearing original with a size of 23 x 12 cm, and 20 prints were made by the printing master with respect to each of the above-mentioned thermosensitive stencil papers Nos. 5 to 8 of the present invention and comparative thermosensitive stencil papers Nos. 4 to 6, and this printing master preparation and print making operation was continuously repeated to make 10 printing masters in total, whereby each stencil paper was evaluated with respect to the transportation performance and the breaking of the thermoplastic resin film thereof before the preservation thereof and after the preservation thereof at 50° C. for one week.

The results are shown in the following TABLE 3:

TABLE 3

| | Sticking Property of Sencil Paper before Preservation | | Sticking Property of Stencil Paper Preserved at 50° C. for 1 Week | |
|---|---|---|---|---|
| | Wrinkles formed during trans-portation of stencil paper | Peeling of thermo-plastic resin film | Wrinkles formed during trans-portation of stencil paper | Peeling of thermo-plastic resin film |
| Ex. 5 | None | None | None | None |
| Ex. 6 | None | None | None | None |
| Ex. 7 | None | None | None | None |
| Ex. 8 | None | None | None | None |
| Comp. Ex. 4 | None | None | Observed | Observed |
| Comp. Ex. 5 | Observed | Observed | Observed | Observed |
| Comp. Ex. 6 | Observed | Observed | Observed | Observed |

The results shown in the above TABLE 3 indicate that the stencil papers Nos. 5 to 8 of the present invention fabricated in Examples 5 to 8 maintained their respective excellent transportation performances even after the preservation at 50° C. for 1 week and no breaking of the thermoplastic resin film took place.

In sharp contrast to this, the transportation performance of each of the comparative stencil papers Nos. 4 to 6 fabricated in Comparative Examples 4 to 6 became conspicuously poor and the breaking of the resin film took place at the rear end of the solid image, with the formation of wrinkles by the platen roller employed, after the preservation.

Example 9

A polyester film with a thickness of about 2 μm was stuck on a sheet of Japanese paper with a basis weight of 11 $g/m^2$ by use of a chlorinated polypropylene resin serving as an adhesive agent with a deposition amount of about 0.5 $g/m^2$ and was then dried at 50° C., whereby a base paper was fabricated.

To the thus fabricated base paper, a modified silicone oil containing layer formation coating liquid, namely a 2.0 wt.% aqueous solution of a mixture of the nonvolatile components with the same formulation as in Example 1 as shown in TABLE 1, was applied with a coating deposition amount of 1.5 $g/m^2$ with a coating speed of 100 m/min by an offset gravure roll, and dried at 50° C., whereby a modified silicone oil containing layer with a deposition amount of about 0.03 $g/m^2$ on a dry basis was formed on the polyester film. Thus, a thermosensitive stencil paper No. 9 of the present invention was fabricated.

Examples 10 to 12 the procedure of the fabrication of the thermosensitive stencil paper No. 9 of the present invention in Example 9 was repeated except that the formulation of the nonvolatile mixture for the modified silicone oil containing layer formation coating liquid employed in Example 9 was changed to the same formulations in Examples 2, 3 and 4, respectively, as shown in TABLE 1, whereby thermosensitive stencil papers Nos. 10 to 12 of the present invention were respectively fabricated in Examples 10 to 12.

Each of the above fabricated thermosensitive stencil papers Nos. 9 to 12 of the present invention in Examples 9 to 12 was subjected to printing master preparation and print making tests by use of a printing master making machine ("Preport SS950" made by Ricoh Company, Ltd. ). More specifically, one printing master was prepared by use of a solid-image-bearing original with a size of 23 x 12 cm and 20 prints were made by the printing master with respect to each of the above-mentioned thermosensitive stencil papers Nos. 9 to 12 of the present invention, and this printing master preparation and print making operation was continuously repeated to make 10 printing masters in total, whereby each stencil paper was evaluated with respect to the transportation performance and the peeling of the thermoplastic resin film thereof before the preservation thereof and after the preservation thereof at 50° C. for one week.

The results were the same as in the case of the previously mentioned thermosensitive stencil papers Nos. 1 to 4 fabricated in Examples 1 to 4.

Example 13

A polyester film with a thickness of about 2 μm was stuck on a sheet of Japanese paper with a basis weight of 11 $g/m^2$ by use of a chlorinated polypropylene resin serving as an adhesive agent with a deposition amount of about 0.5 $g/m^2$ and was then dried at 50° C., whereby a base paper was fabricated.

To the thus fabricated base paper, a modified silicone oil containing layer formation coating liquid, namely a 3.0 wt.% aqueous solution of a mixture of an epoxyether-modified silicone oil, an ether-modified silicone oil, an antistatic agent, and ethyl alcohol with the formulation in Example 13 as shown in TABLE 4, which was prepared by dissolving 10 parts by weight of the epoxyether-modified silicone oil and 75 parts by weight of the ether-modified silicone oil in 50 parts by weight of ethyl alcohol, with the addition of 15 parts by weight of the antistatic agent and water thereto, was applied with a coating deposition amount of about 1 $g/m^2$ with a coating speed of 120 m/min by an offset gravure method, and dried at 50° C., whereby a modified silicone oil containing layer with a deposition amount of about 0.03 $g/m^2$ on a dry basis was formed on the polyester film. Thus, a thermosensitive stencil paper No. 13 of the present invention was fabricated.

Examples 14 to 20 and Comparative Examples 7 to 10

The procedure of the fabrication of the thermosensitive stencil paper No. 13 of the present invention in Example 13 was repeated except that the formulation of the mixture for the modified silicone oil containing layer formation coating liquid employed in Example 13 was changed to the respective formulations in Examples 14 to 20 as shown in TABLE 4, whereby thermosensitive stencil papers Nos. 14 to 20 of the present invention and comparative thermosensitive stencil papers Nos. 7 to 10 were fabricated, respectively, in Examples 14 to 20 and Comparative Examples 7 to 10.

Comparative Examples 11 and 12

The procedure of the fabrication of the thermosensitive stencil paper No. 13 of the present invention in Example 13 was repeated except that the formulation of the mixture for the modified silicone oil containing layer formation coating liquid employed in Example 13 was changed to the respective formulations in Comparative Examples 11 and 12 as shown in TABLE 4, and that the respective two silicone oil emulsions were mixed, and water was then added thereto, whereby comparative thermosensitive stencil papers Nos. 11 and 12 were respectively fabricated in Comparative Examples 11 and 12.

TABLE 4

| | Epoxy-ether-modified silicone oil *6) | Ether-modified silicone oil *7) | Ether-modified silicone oil *8) | Ether-modified silicone oil *9) | Ether-modified silicone oil *10) | Ether-modified silicone oil *11) | Ether-modified silicone oil *12) | Ether-modified silicone oil *13) | Silicone oil emulsion *14) | Silicone oil emulsion *15) | Anti-static agent | Ethyl alcohol |
|---|---|---|---|---|---|---|---|---|---|---|---|---|
| Ex. 13 | 10 | | | | | | 75 | | | | 15 | 50 |
| Ex. 14 | 35 | | | | | | 50 | | | | 15 | 50 |
| Ex. 15 | 55 | | | | | | 30 | | | | 15 | 50 |
| Ex. 16 | 73 | | | | | | 10 | | | | 15 | 50 |
| Ex. 17 | 85 | | | | | | — | | | | 15 | 50 |
| Ex. 18 | | 85 | | | | | | | | | 15 | 50 |
| Ex. 19 | | | 85 | | | | | | | | 15 | 50 |
| Ex. 20 | | | | 85 | | | | | | | 15 | 50 |
| Comp. Ex. 7 | | | | | 85 | | | | | | 15 | 50 |
| Comp. Ex. 8 | | | | | | 85 | | | | | 15 | 50 |
| Comp. Ex. 9 | | | | | | | 85 | | | | 15 | 50 |
| Comp. Ex. 10 | | | | | | | | 85 | | | 13 | 50 |
| Comp. Ex. 11 | | | | | | | | | 80 | 20 | — | — |
| Comp. Ex. 12 | | | | | | | | | 20 | 80 | — | — |

(unit: parts by weight)

*5) Trademark "Elegan 264A" made by NOF CORPORATION.
*6) Trademark "KF945A(HLB 4, 5)" made by Shin-Etsu Chemical Co., Ltd.
*7) Trademark "FZ2110(HLB 1)" made by Nippon Unicar Co., Ltd.
*8) Trademark "FZ2171(HLS 2)" made by Nippon Unicar Co., Ltd.
*9) Trademark "FZ2120(HLB 6)" made by Nippon Unicar Co., Ltd.
*10) Trademark "FZ2164(HLB 9)" made by Nippon Unicar Co., Ltd.

TABLE 4-continued

| | Epoxy-ether-modified silicone oil *6) | Ether-modified silicone oil *7) | Ether-modified silicone oil *8) | Ether-modified silicone oil *9) | Ether-modified silicone oil *10) | Ether-modified silicone oil *11) | Ether-modified silicone oil *12) | Ether-modified silicone oil *13) | Silicone oil emulsion *14) | Silicone oil emulsion *15) | Anti-static agent | Ethyl alcohol |
|---|---|---|---|---|---|---|---|---|---|---|---|---|

*11) Trademark "FZ2104(HLB 14)" made by Nippon Unicar Co., Ltd.
*12) Trademark "KF3S2A(HLB 7)" made by Shin-Etsu Chemical Co., Ltd.
*13) Trademark "FZ2161(HLB 20)" made by Nippon Unicar Co., Ltd.
*14) Trademark "MS8705" made by Dow Corning Toray Silicone Co., Ltd.
*15) Trademark "MS8710" made by Dow Corning Toray Silicone Co., Ltd.

In the above coating operations by use of the offset gravure roll, no clogging took place in the gravure roll in Examples 13 to 20 and Comparative Examples 7 to 10, and there were no variations in the deposition amount in 10,000-meter coating. However, in Comparative Examples 11 and 12, the clogging of the gravure roll was caused by the destruction of the respective silicone oil emulsions, so that the respective deposition amounts were reduced to half (½) after 2,000-meter coating.

Each of the above fabricated thermosensitive stencil papers Nos. 13 to 20 of the present invention fabricated in Examples 13 to 20 and comparative thermosensitive stencil papers Nos. 7 to 12 fabricated in Comparative Examples 7 to 11 was subjected to printing master preparation and print making tests by use of a printing master making machine ("Preport SS950" made by Ricoh Company, Ltd.). More specifically, one printing master was prepared by use of a solid-image-bearing original with a size of 23 x 12 cm, and 20 prints were made by printing master with respect to each of the above-mentioned thermosensitive stencil papers Nos. 13 to 20 of the present invention and comparative thermosensitive stencil papers Nos. 7 to 12, and this printing master preparation and print making operation was continuously repeated to make 10 printing masters in total, whereby each stencil paper was evaluated with respect to the transportation performance and the peeling of the thermoplastic resin film thereof before the preservation thereof and after the preservation thereof at 50° C. for one week.

The results are shown in the following TABLE 5:

TABLE 5

| | | Sticking Property of Sencil Paper before Preservation | | Sticking Property of Stencil Paper Preserved at 50° C. for 1 Week | | |
|---|---|---|---|---|---|---|
| | | Wrinkles formed during transportation of stencil paper | Peeling of thermoplastic resin film | Wrinkles formed during transportation of stencil paper | Peeling of thermoplastic resin film | Coating Performance |
| Ex. 13 | | None | None | None | None | Gravure roll not clogged |
| Ex. 14 | | None | None | None | None | |
| Ex. 15 | | None | None | None | None | |
| Ex. 16 | | None | None | None | None | |
| Ex. 17 | | None | None | None | None | |
| Ex. 18 | | None | None | None | None | |
| Ex. 19 | | None | None | None | None | |
| Ex. 20 | | None | None | None | None | |
| Comp. Ex. 7 | | None | None | Observed | Observed | |
| Comp. Ex. 8 | | Observed | Observed | Observed | Observed | |
| Comp. Ex. 9 | | Observed | Observed | Observed | Observed | |
| Comp. Ex. 10 | | Observed | Observed | Observed | Observed | |
| Comp. Ex. 11 | At the initial coating stage | None | None | None | None | Gravure roll clogged |
| | (2,000 m) | None | None | Observed | Observed | |
| Comp. Ex. 12 | At the initial coating stage | None | None | Observed | Observed | |
| | (2,000 m) | Observed | Observed | Observed | Observed | |

The results shown in the above TABLE 5 indicate that the stencil papers Nos. 13 to 20 of the present invention fabricated in Examples 13 to 20 maintained their respective excellent transportation performances even after the preservation at 50° C. for 1 week and no peeling of the thermoplastic resin film took place.

In sharp contrast to this, the transportation performance of each of the comparative stencil papers Nos. 7 to 12 fabricated in Comparative Examples 7 to 12 eventually became conspicuously poor and the peeling of the resin film took place at the rear end of the solid image, with the formation of wrinkles by the platen roller employed, after the preservation.

Japanese Patent Application No. 7-057972 filed Feb. 22, 1995, Japanese Patent Application No. 7-139916 filed May 15, 1995 and Japanese Patent Application filed Jan. 25, 1996 are hereby incorporated by reference.

What is claimed is:

1. A thermosensitive stencil paper comprising a thermoplastic resin film, and a modified silicone oil containing layer formed thereon which comprises at least one modified silicone oil component selected from group consisting of (a) an ether•epoxy-modified silicone oil having both an epoxy group and an ether group and (b) an ether-modified silicone oil with HLB of 6 or less.

2. The thermosensitive stencil paper as claimed in claim 1, further comprising a porous support for supporting thereon said thermoplastic resin film.

3. The thermosensitive stencil paper as claimed in claim 1, wherein said modified silicone oil containing layer provided on said thermoplastic resin film is in a deposition amount in the range of 0.005 to 0.5 $g/m^2$ on a dry basis.

4. A method of producing a thermosensitive stencil paper comprising a thermoplastic resin film, and a modified silicone oil containing layer formed thereon which comprises at least one modified silicone oil component selected from the group consisting of (a) an ether•epoxy-modified silicone oil having both an epoxy group and an ether group and (a) an ether modified silicone oil with HLB of 6 or less, comprising the step of coating said thermoplastic resin film with a coating liquid comprising at least one modified silicone oil component selected from the group consisting of (a) an ether•epoxy-modified silicone oil having both an epoxy group and an ether group and (b) an ether-modified silicone oil with HLB of 6 or less, in an amount of 2.0 $g/m^2$ or less before the drying of said coating liquid.

5. The method as claimed in claim 4, wherein said thermosensitive stencil paper further comprises a porous support for supporting said thermoplastic resin film thereon.

* * * * *

UNITED STATES PATENT AND TRADEMARK OFFICE
CERTIFICATE OF CORRECTION

PATENT NO. : 5,707,712
DATED: : JANUARY 13, 1998
INVENTOR(S) : Manabu FUJIMURA et al It is certified that error appears in the above-identified patent and that said Letters patent is hereby corrected as shown below:

Column 8, line 13, "K76004(HLB 9)" should read --KF6004(HLB 9)--.

Table 2, Top of first column "Sencil" should read --Stencil--.

Column 11, lines 30 and 31, "epoxyether-modified" should read --epoxy•ether-modified--;
line 34, "epoxyether-modified" should read --epoxy•ether-modified--.

Table 3, Top of first column "Sencil" should read --Stencil--;
In rows 2 and 4, "Peeling" should read --Breaking--.

UNITED STATES PATENT AND TRADEMARK OFFICE
CERTIFICATE OF CORRECTION

PATENT NO. : 5,707,712
DATED: : JANUARY 13, 1998
INVENTOR(S) : Manabu FUJIMURA et al It is certified that error appears in the above-identified patent and that said Letters patent is hereby corrected as shown below:

Table 4, Under Heading "Antistatic agent"
--13-- should read --15--;
Last line under Table 4, "FZ2164(HLB 9)"
should read --FZ2164(HLB 8)--.

Table 5, First column, "Sencil" should read --Stencil--.

Signed and Sealed this

Second Day of February, 1999

*Attest:*

*Attesting Officer*

*Acting Commissioner of Patents and Trademarks*